United States Patent [19]

Hall et al.

[11] Patent Number: 4,632,409
[45] Date of Patent: Dec. 30, 1986

[54] COMBINATION AUTOMOBILE INFANT SEAT AND BABY STROLLER ASSEMBLY

[76] Inventors: Patricia A. Hall, 2072 Shadybrook Ct.; Alexander Ratony, 2076 Shadybrook Ct., both of Thousand Oaks, Calif. 91362

[21] Appl. No.: 593,551

[22] Filed: Mar. 26, 1984

[51] Int. Cl.[4] .............................................. B62B 1/04
[52] U.S. Cl. .................................... 280/30; 280/643; 280/648
[58] Field of Search .................... 280/648, 643, 39, 40, 280/30, 43, 14; 297/130, 250

[56] References Cited

U.S. PATENT DOCUMENTS

| 2,509,103 | 5/1950 | Lewis et al. | 297/130 |
|---|---|---|---|
| 2,720,911 | 10/1955 | Lantz | 297/130 |
| 3,100,651 | 8/1963 | Reese | 280/30 |
| 3,290,080 | 12/1966 | Ezquenra | 280/30 |
| 3,542,419 | 11/1970 | Spinola | 297/130 |
| 3,829,113 | 8/1974 | Epelbaum | 280/30 |
| 3,917,312 | 11/1975 | Rodaway | 297/130 |

FOREIGN PATENT DOCUMENTS

| 459587 | 9/1949 | Canada | 280/39 |
|---|---|---|---|
| 815454 | 7/1949 | Fed. Rep. of Germany | 280/39 |
| 2274490 | 1/1976 | France | 280/643 |
| 375429 | 10/1939 | Italy | 280/39 |
| 602397 | 5/1948 | United Kingdom | 155/38 |
| 1412580 | 11/1975 | United Kingdom | 297/250 |

*Primary Examiner*—John J. Love
*Assistant Examiner*—Mark C. Dukes
*Attorney, Agent, or Firm*—Albert O. Cota

[57] ABSTRACT

A combination automobile infant seat and baby stroller assembly that allows the automobile infant seat to be easily and quickly converted to a conventional baby stroller. The conversion is accomplished by a retractable wheel and fender assembly. When the invention is in the infant seat configuration, the wheels and fenders are in the retracted position allowing the wheels to serve as a stable platform. When it is desired to use the invention as a baby stroller, it is removed from the vehicle compartment and the wheel and fender assembly is pressed downwardly to cause the wheel locking mechanism to lock the wheels in place. The invention also features an infant seat attachment base that allows various models of infant seats to be safely secured and angularly adjusted. Two other designs are also disclosed where each employ a different type of wheel retracting and extending mechanisms.

8 Claims, 22 Drawing Figures

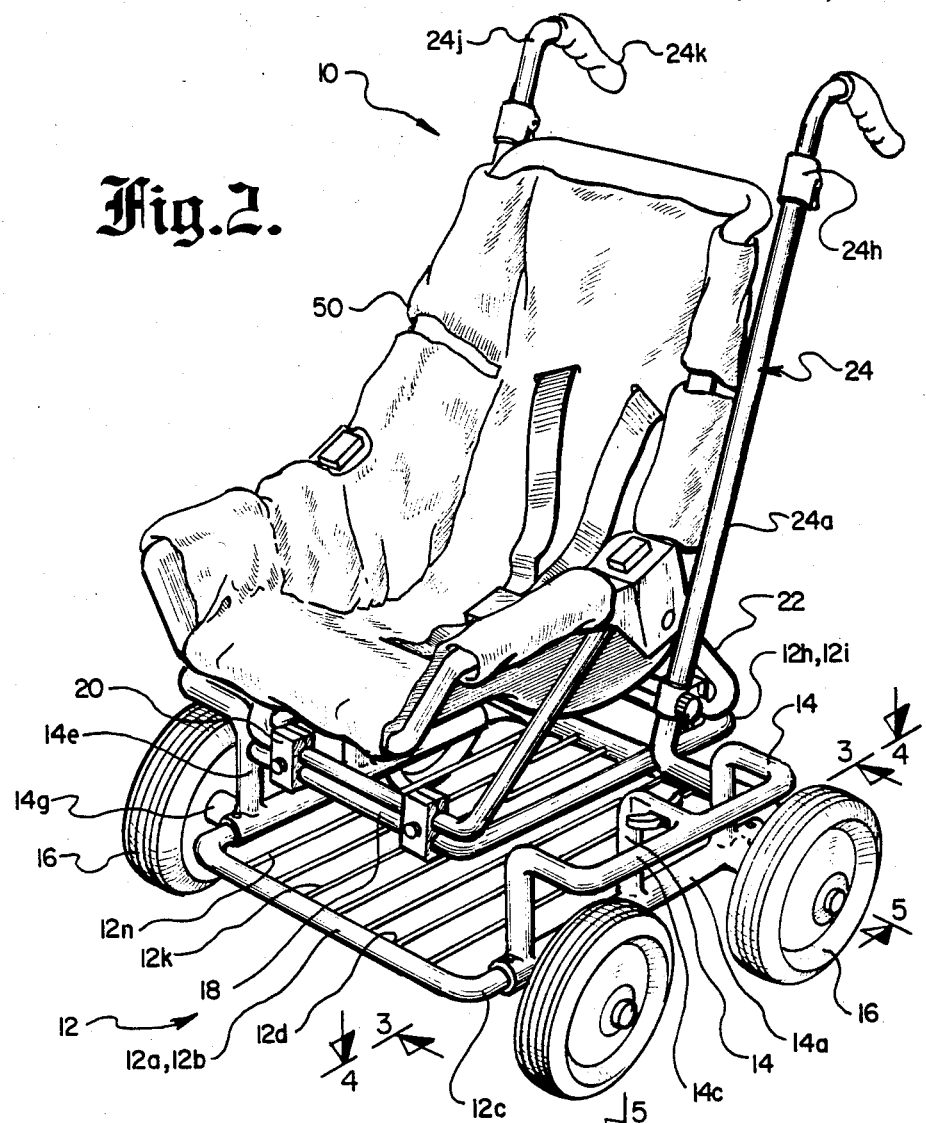
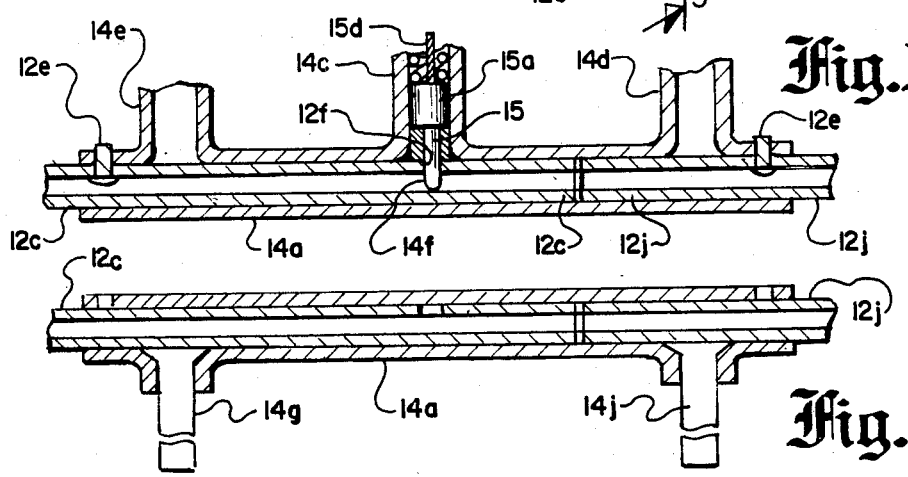

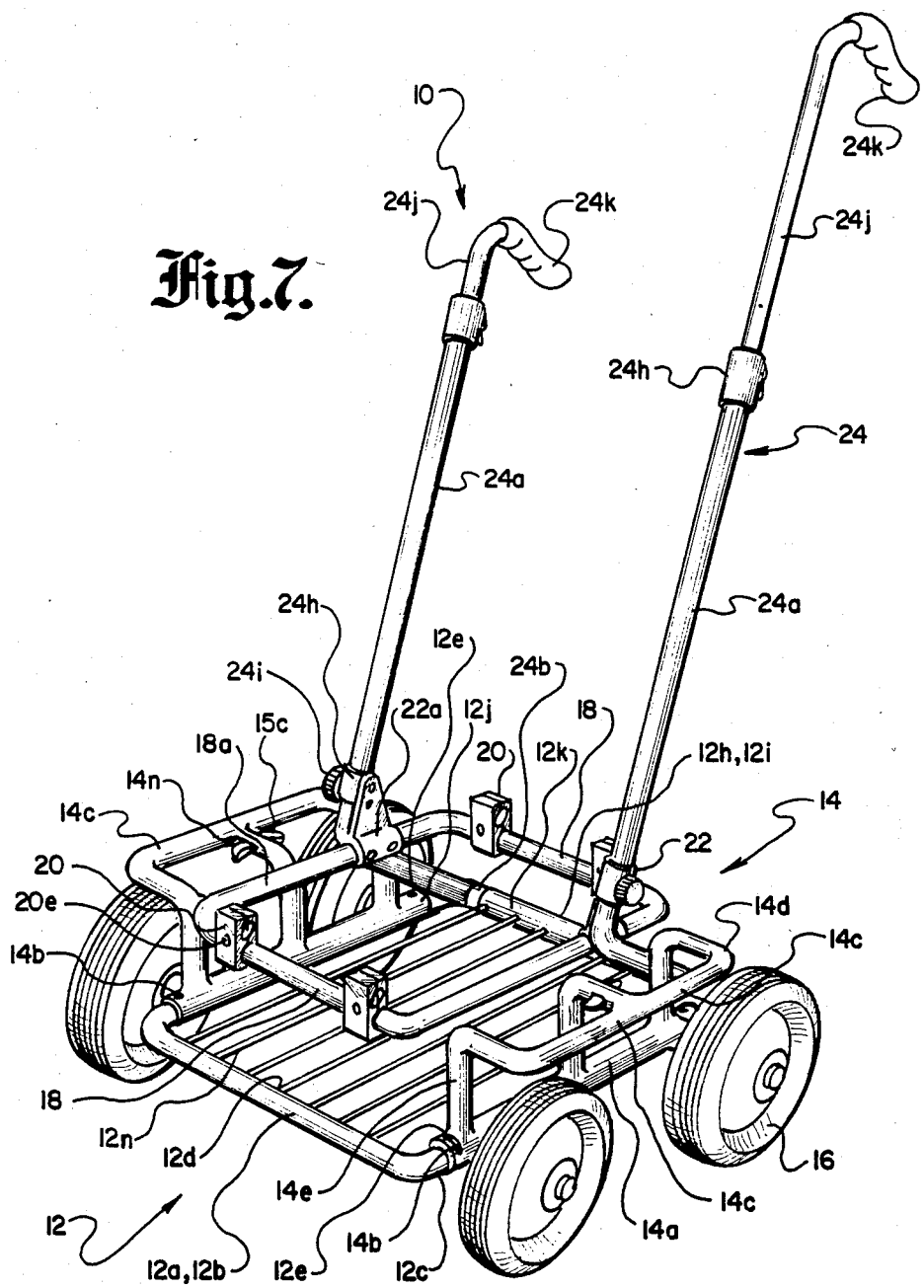

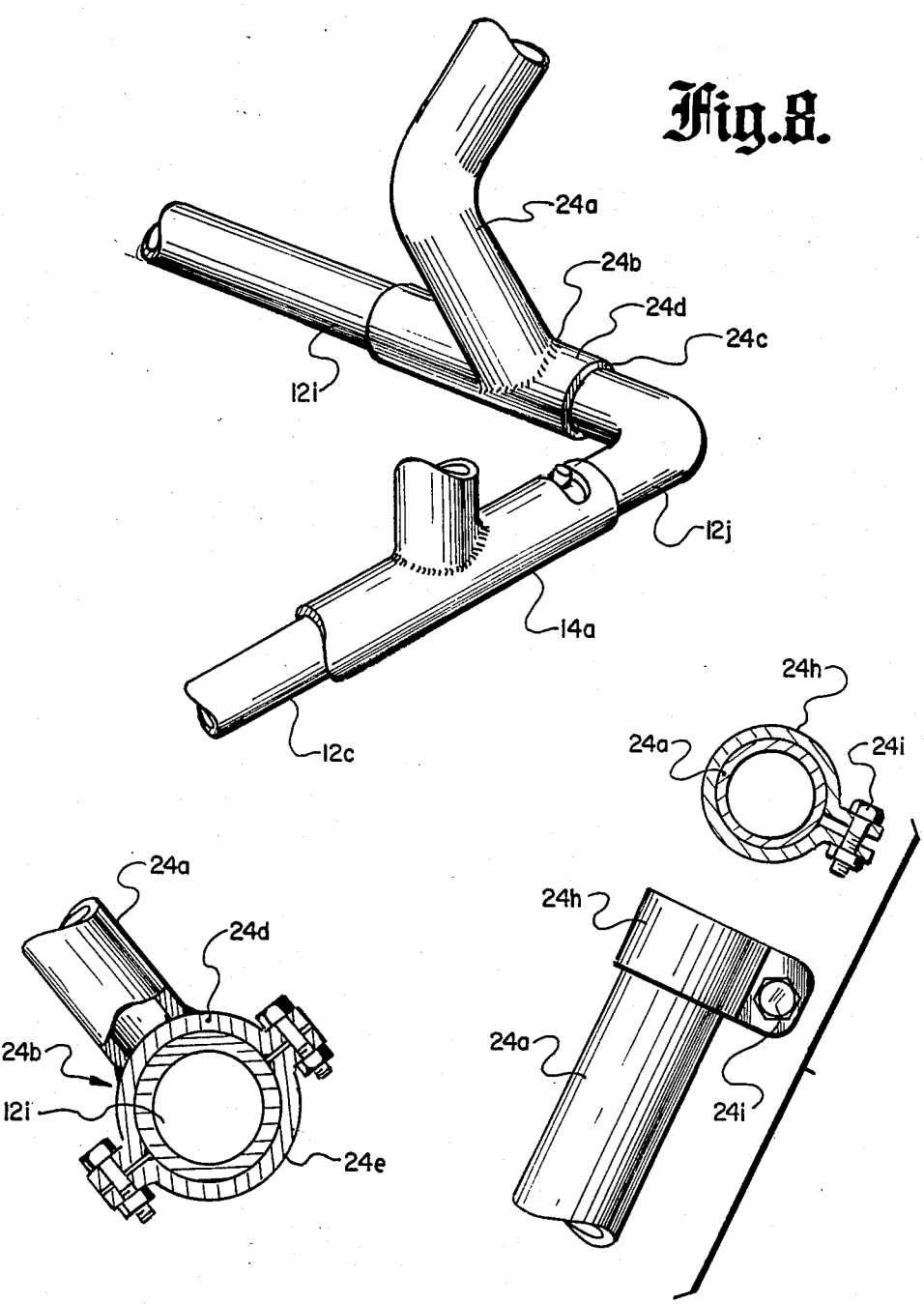

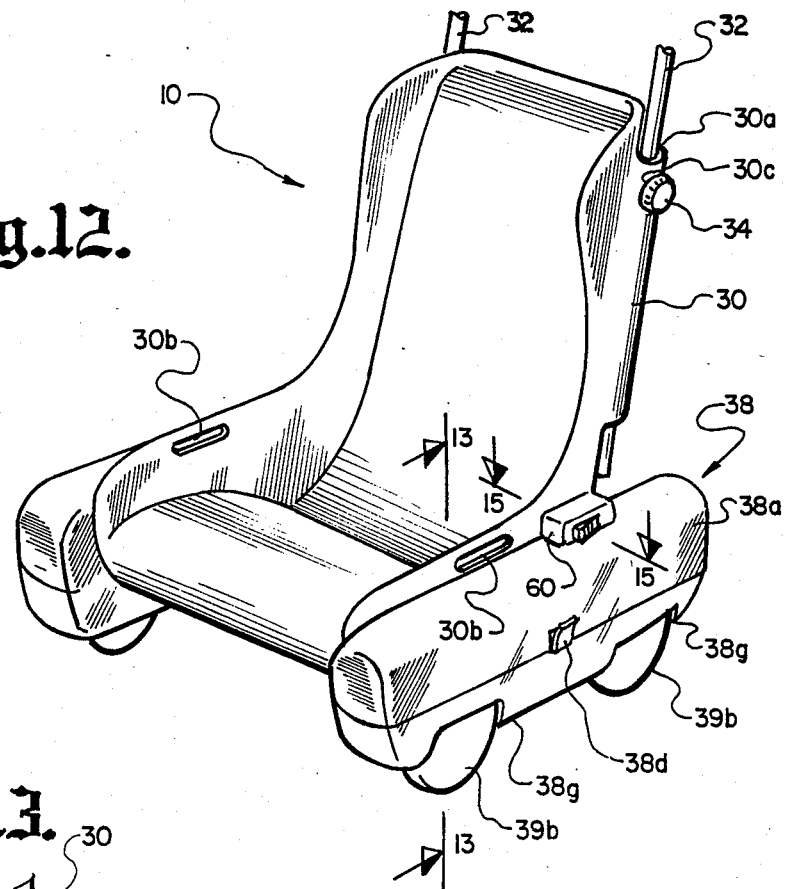
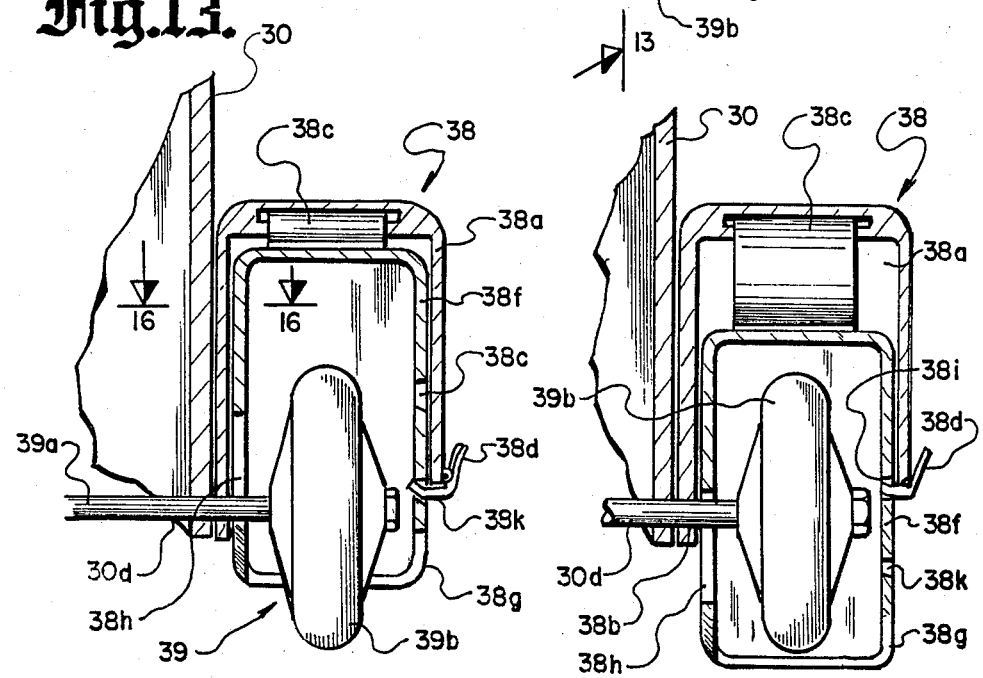

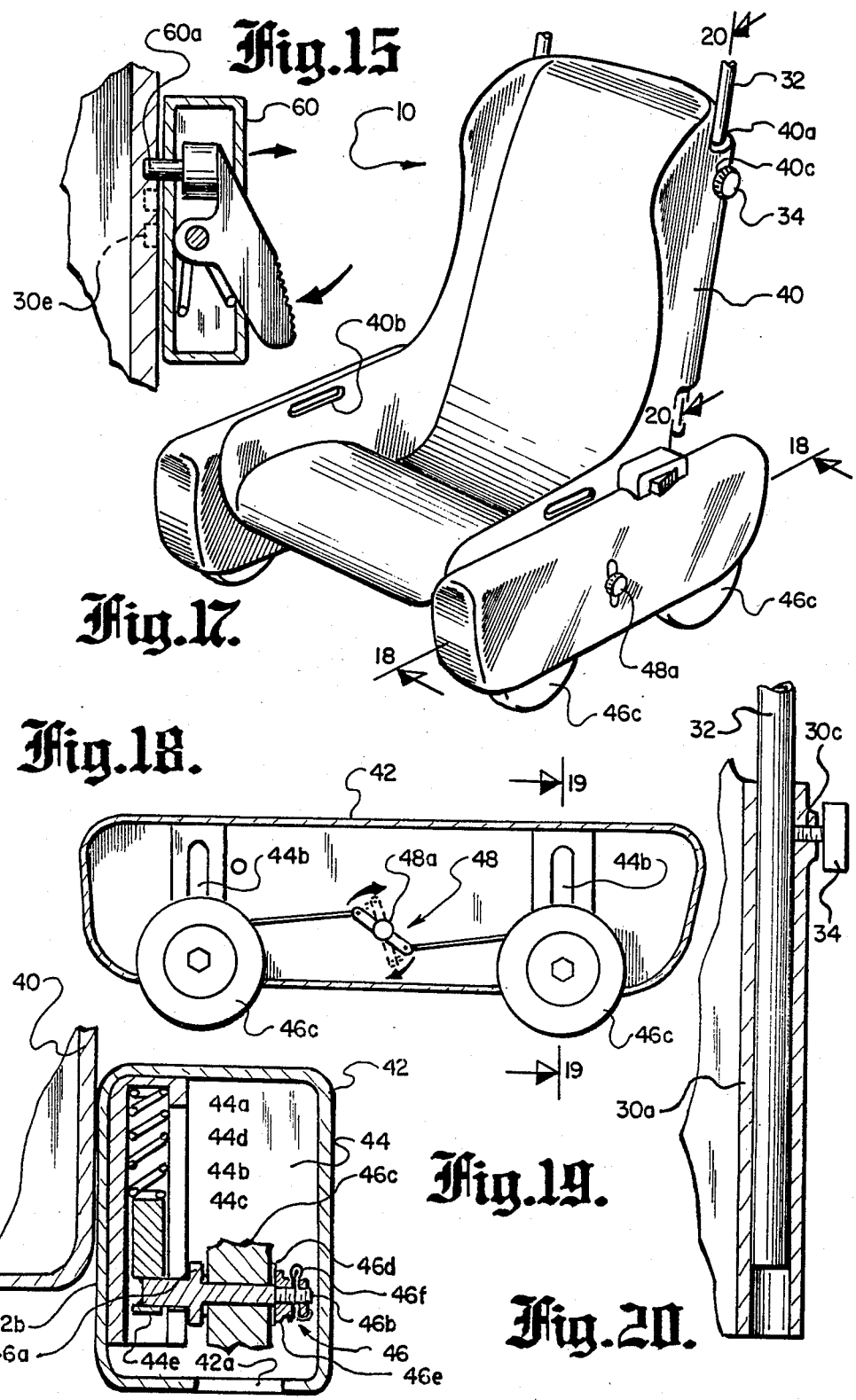

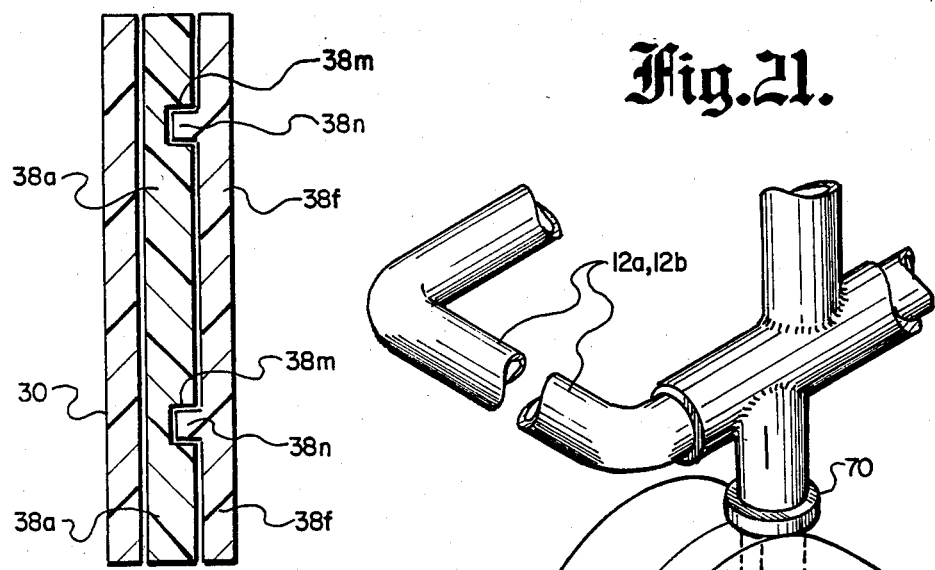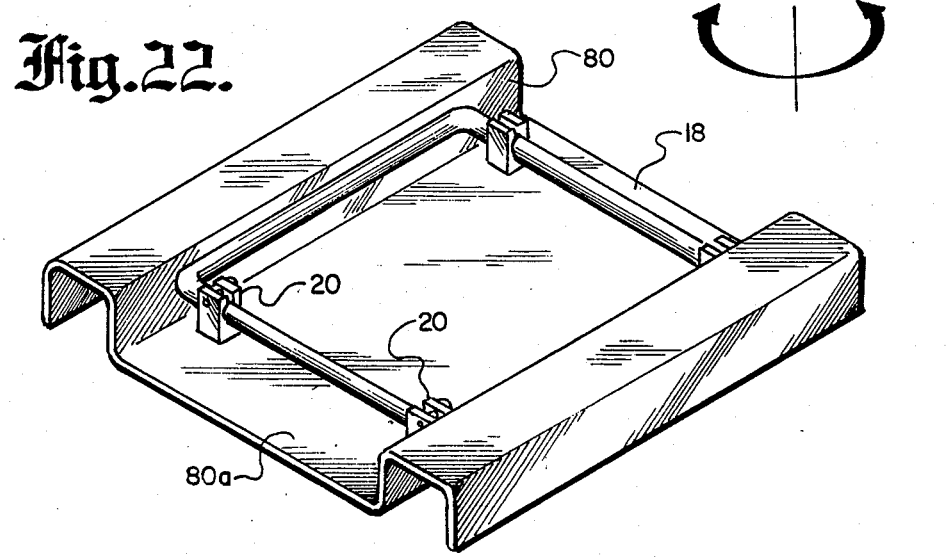

COMBINATION AUTOMOBILE INFANT SEAT AND BABY STROLLER ASSEMBLY

TECHNICAL FIELD

The invention pertains to the general field of infant carriers such as automobile infant seats and baby strollers and more particularly to a combination automobile infant seat and baby stroller that can be readily converted from one form to the other.

BACKGROUND ART

Infant carriers such as infant automobile seats and baby strollers have long been popular purchased items amongst guardians of small children. Particularly, because of the widespread use of automobile infant seats and in the interest of safety, the U.S. Federal Government recently issued a Federal regulation, enforceable through the various states, requiring that infant automobile seats follow specified design guidelines to assure that these items are built to a standard that will provide maximum protection to a seated child in the event of an automobile accident.

Infant automobile seats are currently not designed or equipped with the necessary structure and implements to be adaptable for use other than for their intended use as automobile seats. Thus, it is a common practice for todays guardians to purchase an individual automobile seat and baby stroller and to use each of these items only for their intended use. This poses a problem in that when a trip is planned, each of the items must be individually transported causing an inconvenience and a potential transportation storage problem. Additionally, because of the separate purchase, the cost of ownership and maintenance is increased.

A search of the prior art did not disclose any patents that read directly on the claims of the instant invention. However, the following U.S. patents are considered related and indicative of the state-of-the-art:

| PATENT NUMBER | INVENTOR | ISSUED |
| --- | --- | --- |
| 4,231,612 | Meeker | 4 November 1980 |
| 4,072,345 | Matsuda | 7 February 1978 |
| 3,976,328 | Stahel | 24 August 1976 |
| 3,873,117 | Perego | 25 March 1975 |

The Meeker patent discloses a baby carrier which may also be used as a conventional seat or as a car seat. The carrier is adjustable to various declining positions where the adjustments can be made without having to remove the baby from the seat. The design also allows the use of the automobile seat belt to safeguard the child in the event of a crash.

The Matsuda patent discloses an improved baby carriage for accommodating an infant in transport. The improvement is comprised of a back rest portion having an opening which is disposed to keep the compartment aerative. The aerative section prevents a heat building-up that during hot days causes a discomfort to the seated infant.

The Stahel patent discloses a combination baby carrier and seat comprising a double-walled shell that includes a seat and a back. The shell includes an attached tubular stand that allows the carrier to be adjusted in a plurality of reclining positions.

The Perego patent discloses a foldable wheeled baby carriage that can be carried on a persons arm when not in use. The carriage includes a fabric forming a closed top or parasol which overhangs the seat portion to provide a shade or covering.

DISCLOSURE OF THE INVENTION

The invention is comprised of a combination automobile infant seat and baby stroller that can be easily and quickly converted from one form to the other. Thus eliminating the need for having to store, transport and/or purchase a separate automobile infant seat and a baby stroller.

Three inventive embodiments are disclosed, where the major design element common to all three embodiments, is an assembly that allows the wheels of the invention to be retracted and extended. In the wheels retracted position, the invention serves as an automobile infant seat; when the wheels are extended, the invention functions as a baby stroller. Three distinct wheel retracting/extending mechanisms are described. The three embodiments also incorporate a telescoping handlebar and pushing assembly that can be adjusted to fit the height of the user and an optional 360-degree swiveling front wheel assembly.

The first embodiment also features an infant seat attachment base that allows the use and adjustment of several types of currently available automobile seats. In the other two embodiments the primary infant seat is a molded one-piece structure that serves as the central point to which are attached the remaining elements comprising the invention. However, a double wheel housing incorporating an infant seat attachment base is also disclosed. This housing, which is designed to be used with the second and third embodiments, also allows various types of infant seats to be used and adjusted.

In addition to providing the obvious advantage of eliminating the need for having both an automobile infant seat and a baby stroller, it is also an objective to provide an invention that:

can be easily and quickly converted from an automobile infant seat to a baby stroller by most anyone,
meets the California Buckle-up Law (SB 537) covering automobile seat safety requirements as required by Federal law,
is cost effective in terms of manufacturing and ownership,
is reliable in terms of its mechanical operation,
is easily maintainable in the event of a malfunction and,
is aesthetically designed.

These and other objects and advantages of the invention will become apparent from the subsequent detailed description and the claims taken in conjunction with the accompanying drawings.

BRIEF DESCRIPTION OF THE DRAWINGS

The details of the invention are described in connection with the accompanying drawings in which:

FIG. 2 is a perspective view of the preferred embodiment depicting the invention in the baby stroller configuration with the wheels in the extended position.

FIG. 3 is a sectional side view taken along lines 3—3 of FIG. 2 showing some of the internal details of the locking pin piston and the rotational interface between the carriage base assembly and the retractable wheel and fender assembly.

FIG. 4 is a sectional top view taken along lines 4—4 of FIG. 2 showing the details of the wheel axle and the rotational interface between the carriage base assembly and the retractable wheel and fender assembly.

FIG. 7 is a perspective view of the preferred embodiment depicting the invention in the baby stroller configuration without the seat attached.

FIG. 8 is a detail view showing the lower handlebar section attached to the carriage base assembly.

FIG. 9 is a cross sectional view of the lower handlebar section attached to the carriage base assembly.

FIG. 10 is a side and top view showing the handlebar adjustment sleeve attached to the lower handlebar section.

FIG. 12 is a perspective view of the second embodiment showing the invention with the wheels extended in the baby stroller configuration.

FIG. 13 is a sectional view taken along lines 13—13 of FIG. 12 showing the retractable wheel housing assembly with the lower wheel housing in the retracted position exposing the wheels.

FIG. 14 is a sectional view of the retractable wheel housing assembly with the lower wheel housing shown in the extended position as would be configured for use as an automobile infant seat.

FIG. 15 is a sectional view of the spring-loaded lock-rod device taken along lines 15—15 of FIG. 12 showing the lock rod inserted into one of the seat adjustment bores.

FIG. 16 is a sectional view of the upper housing guide channels and corresponding guide rails taken along lines 16—16 of FIG. 13.

FIG. 17 is a perspective view of the third embodiment showing the invention with the wheels extended in the baby stroller configuration.

FIG. 18 is a sectional view taken along lines 18—18 of FIG. 17 showing the wheels extended and a wheel retracting/extending mechanism.

FIG. 19 is a sectional view taken along lines 19—19 of FIG. 18 showing the wheel retracting/extending assembly in the wheel extended position.

FIG. 20 is a sectional view taken along lines 20—20 of FIG. 17 showing a handlebar steering rod and a handlebar steering and adjustment knob.

FIG. 21 is a perspective view of a front wheel swiveling assembly.

FIG. 22 is a perspective view of the double wheel housing incorporating an infant seat attachment base.

BEST MODE FOR CARRYING OUT THE INVENTION

Figure 1:
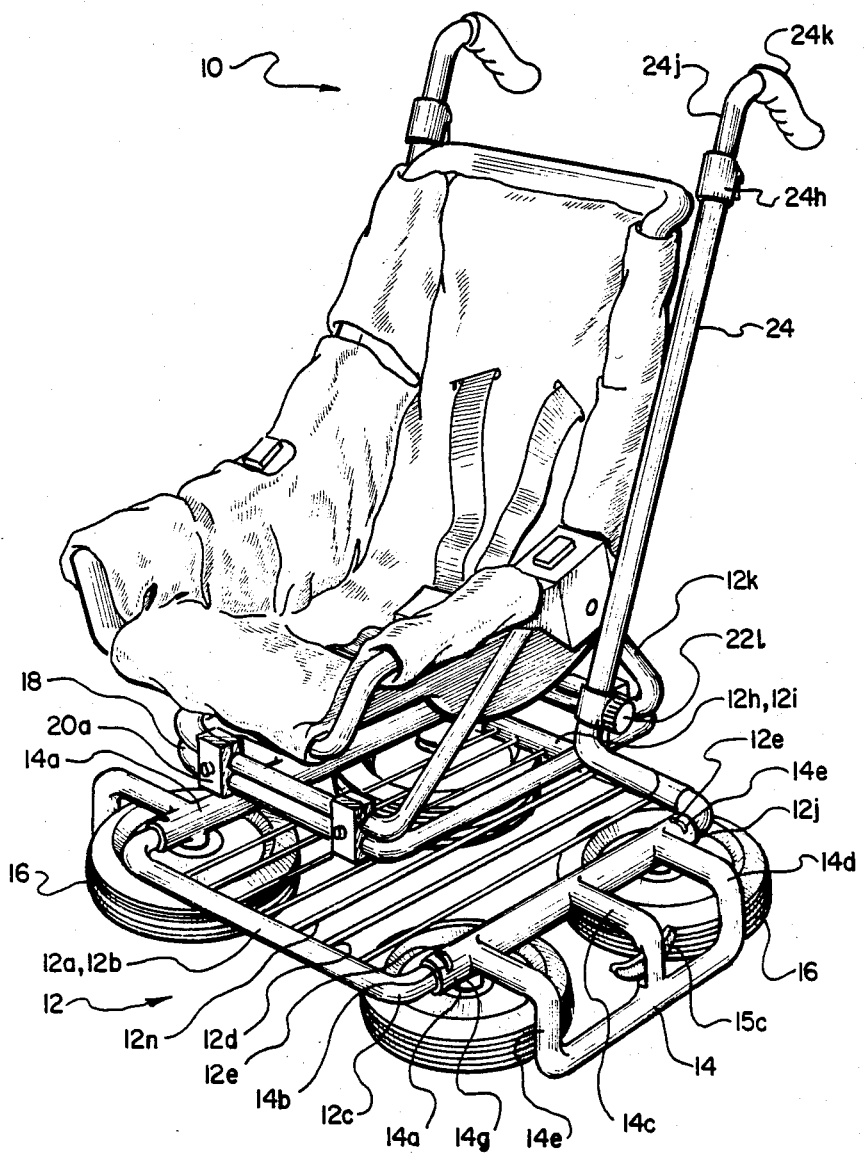
FIG. 1 is a perspective view of the preferred embodiment depicting the invention in the automobile seat configuration with the wheels in the retracted position.

The combination automobile infant seat and baby stroller assembly 10 is presented in terms of three embodiments. The basic and major commonality in the three designs is a wheel retracting and extending assembly that permits the user to easily and quickly convert the assembly 10 from an automobile infant seat to a baby stroller.

The best mode for carrying out the invention and the preferred embodiment of the assembly 10, as shown in FIGS. 1 through 11, is comprised of a purchased infant seat 50 and eight major elements: a carriage base assembly 12, a pair of retractable wheel and fender assemblies 14, a pair of wheel locking mechanisms 15, four wheels 16, an infant seat attachment base 18, a plurality of adjustable infant seat adapters 20, a pair of infant seat positioning sleeves 22, and a pair of handlebar steering assemblies.

The carriage base assembly 12, as best shown in FIGS. 1, 2 and 7, is configured in the shape of a rectangle that is comprised of a front U-shaped member 12a, and a back U-shaped member 12h.

The front member 12a has a front end section 12b and two contiguous parallel front-side sections 12c where each section extends beyond the side midpoint of the rectangle. The front end section has a plurality of front strut rod bores 12d that extend through the inside surface and near the front of each front side section is located a front wheel and fender alignment pin 12e extending upwardly as best shown in FIGS. 1 and 7. Each of the front-side sections also have a set of first wheel and fender locking pin bore 12f, as shown in FIG. 3, that extends through the upper surface and that is located at a point on each of the front-side sections 12c that corresponds to the midpoint of the assembled rectangle side. Each of the bores 12f, as best shown in FIG. 3, are 90-degrees apart where the vertical bore (0 degrees) is used when the wheels 16 are extended and where the horizontal bore (90-degrees) is used when the wheels are retracted.

The back U-shaped member 12h has a back-end section 12i and two contiguous parallel back-side sections 12j having their ends abutting with the ends of their respective front-side section 12c. The back end section 12j also has on its inside surface a plurality of back strut-rod bores 12k corresponding in quantity and aligned with their respective front strut-rod bores 12d. At the time of manufacture, a plurality of horizontal support struts 12n are inserted into the strut rod bores 12d, 12n. These struts provide structural integrity and serve to support packages and baby implements during use of the assembly 10. Near the back of each backside section is also located a back wheel and fender assembly alignment pin 12e extending upwardly as best shown in FIG. 1. This pin as well as the front wheel and fender alignment pin 12e are spring loaded to allow the front-side section 12c and back-side section 12j to be easily inserted into the horizontal support sleeve 14a of the retractable wheel and fender assembly 14.

At the time of manufacture, in addition to attaching the horizontal support struts 12h, there is also attached to each of the side sections 12e, 12j a retractable wheel and fender assembly 14 as shown in FIGS. 1, 2 and 7.

Each of the assemblies 14 is comprised of a horizontal support sleeve 14a, an upper horizontal member 14c, a set of wheel axles 14g and an inward, outward, and center vertical member 14d, 14e, 14f respectively.

The horizontal support sleeve 14a, has an inside diameter that allows the front-side sections 12c of the front U-shaped member 12a to slip into the respective front sleeve openings. Likewise, the back-side sections 12j of the back U-shaped member 12h slips into the respective back sleeve openings of the horizontal support sleeve 14.

At each upper end of the horizontal support sleeve 14a, as shown in FIG. 1, is located a 90-degree alignment slot 14b. The slot has an opening that allows the front wheel and fender alignment pin 12e on the carriage base assembly 12 to fit upwardly into the respective alignment slot 14b. The pin and slot combination allows the horizontal support sleeve to traverse through a 90-degree arc. In FIG. 1, the sleeve 14a is shown traversed to one of its maximum positions corresponding to the retracted wheel position. In FIG. 2, the sleeve has traversed to its other maximum position corresponding to an extended wheel position. Also located on the upper surface of the horizontal support sleeve 14a and in alignment with the first wheel and fender locking pin bore 12f is a second wheel and fender locking pin bore 14g.

Figure 5:
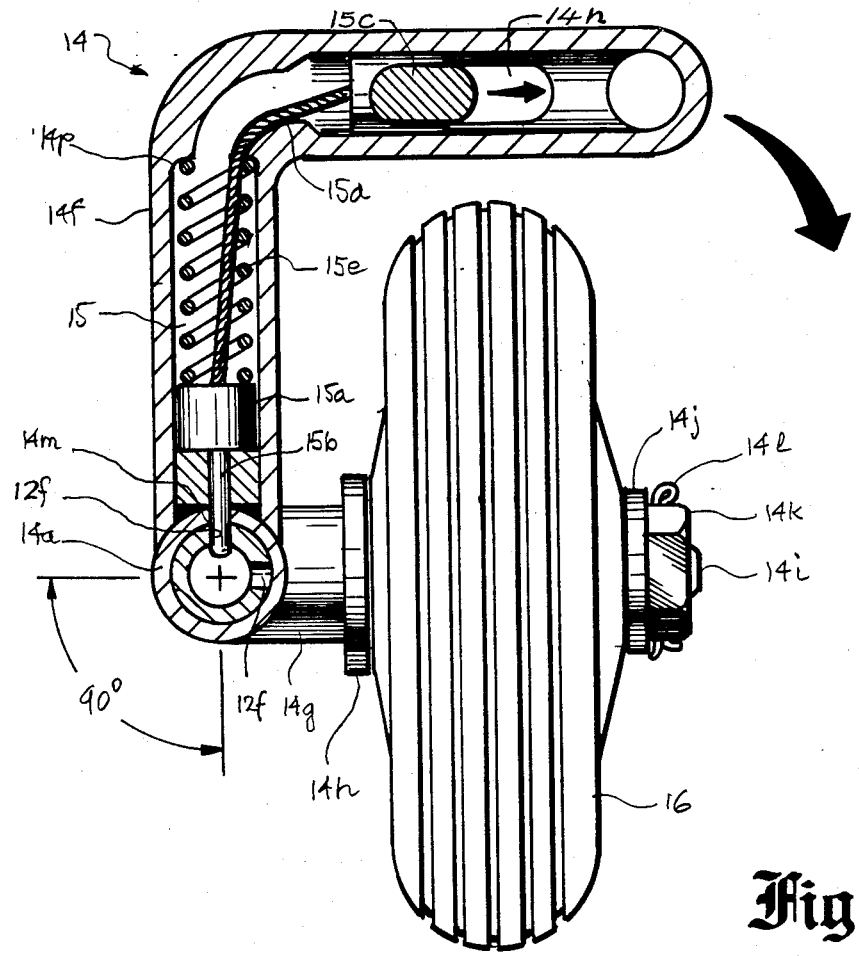
FIG. 5 is a partial cutaway view of the wheel locking mechanism used in the preferred embodiment.

From the front and back outward sides of the sleeve 14 is conventionally attached a wheel axle 14g that extends horizontally outward. Each axle, as best shown in FIG. 5, has an inward wheel flange 14h and an outward threaded section 14i. Into each axle is rotatably inserted a wheel 16. The wheel as best shown in FIG. 5, is held in place by an outward wheel washer 14j and a wheel axle nut 14k. In turn, the wheel nut is secured to the axle by means of a cotter key 14l. Other wheel retaining means, well known in the art may also be used.

The upper horizontal member 14c, as best shown in FIGS. 1 and 2, has attached to its back surface three vertical members; at its back is the inward vertical member 14d, at its front the outward vertical member 14e and in the center is located the center vertical member 14f. Each of the vertical member are contiguous with the upper horizontal member 14c and curve downwardly at a 90-degree angle the bottom end of each of the members are attached conventionally to the upper surface of the horizontal support sleeve 14a. The upper horizontal member and the three vertical members comprise the fender section of the retractable wheel and fender assembly 14.

The center vertical member 14f which also serves as the housing for the wheel locking mechanism 15, has an inside diameter incorporating, as best shown in FIG. 5, a spring retaining ledge 14p and located near its outward end, that is the end near the upper horizontal member 14c, a pin release handle slot extending parallel and through both side walls of the member 14f.

The wheel locking mechanism 15, as also shown in FIG. 5 is comprised of a locking pin piston 15a, a locking pin 15b, a pin release handle 15c, a pin release cable 15d, and a downward bias spring 15e. The locking pin piston 15a has a diameter that allows the piston to traverse the inside diameter of the member 14f. At the bottom of the piston is conventionally attached a locking pin 15b. The pin has a diameter that allows the pin to fit sequentically into one of the first wheel and fender locking pin bores 14f, and into the second wheel and fender locking pin bore 14g.

Through the pin release handle slot 14n which is located on the center vertical member 14f, is inserted the pin release handle 15c. Attached to the inward side of the handle is one side of the pin release cable 15d while the other side of the cable is attached to the top of the locking pin piston 15a. A downward pressure is maintained at the top of the piston 15a by the downward bias spring 15e. The spring is maintained in position by having the upper spring section rest against the spring retaining ledge 14p located within the center vertical member 14f as shown in FIG. 5.

Whether the retractable wheel and fender assembly 14 is in the retracted or extended position the locking pin 15b is inserted into either the first or second wheel and fender locking pin bores 12f 14g. To release the pin, the pin release handle 15c is pulled outwardly, as shown in FIG. 5, and the fender assembly 14 is moved into the desired retracted or extended position. Once the selected position is attained, the pin release handle 15c is released and allowed to come to rest into one of locking pin bores 12f, 14g.

For safety reasons all the moving parts of the wheel locking mechanism 15, with the exception of the pin release handle 15c, are inaccessible to the seated child.

Figure 6:
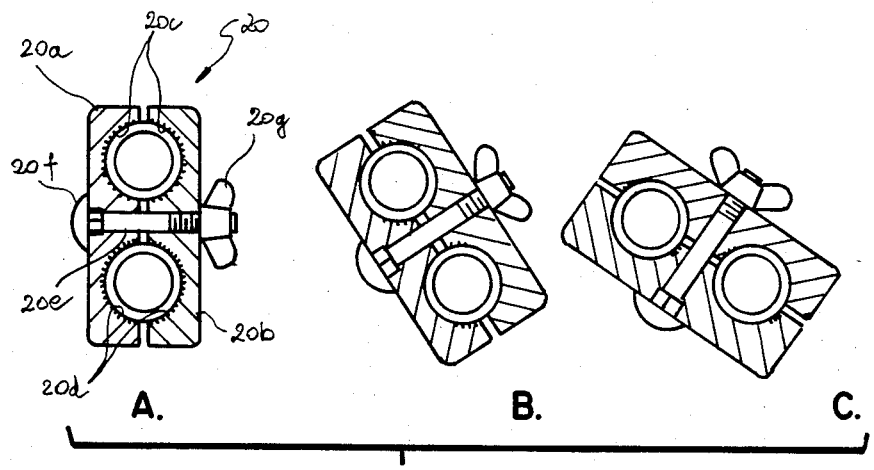
FIG. 6 is a sectional view of the adjustable infant seat adapter, as used in the preferred embodiment, shown in three angular positions.

The infant seat attachment base 18 is a tubular contiguous element configured in the shape of a rectangular frame. Attached to the front and back tubular sections are a set of adjustable infant seat adapters 20 as shown in FIGS. 6 and 7. In the preferred embodiment there are two adapters in the front and two in the back. The adapters 20 are comprised of an outer section 20a and a matching inner section 20b. The outer section 20a has an upper concave area 20c and a lower concave area 20d. Between the two concave area is an adjustment bolt bore 20e extending therethrough. The inner section 20b is the reverse of the outer section. To attach the adapters to the infant seat attachment base 18, the lower concave area 20d is placed over the front or back tubular sections while the upper concave area 20c are placed over the tubular member of an infant seat 50. The two halves are then tightened by inserting an adjustment bolt 20f and tightening the bolt by means of a nut such as a winged nut 20g. As shown in FIG. 6, the adapters 20 may be adjusted angularly and laterally to allow various sizes of infant seats 50 to be used. Also attached to each side of the side tubular structure 18a of the infant seat attachment base 18 is the infant seat positioning device 22.

Figure 11:
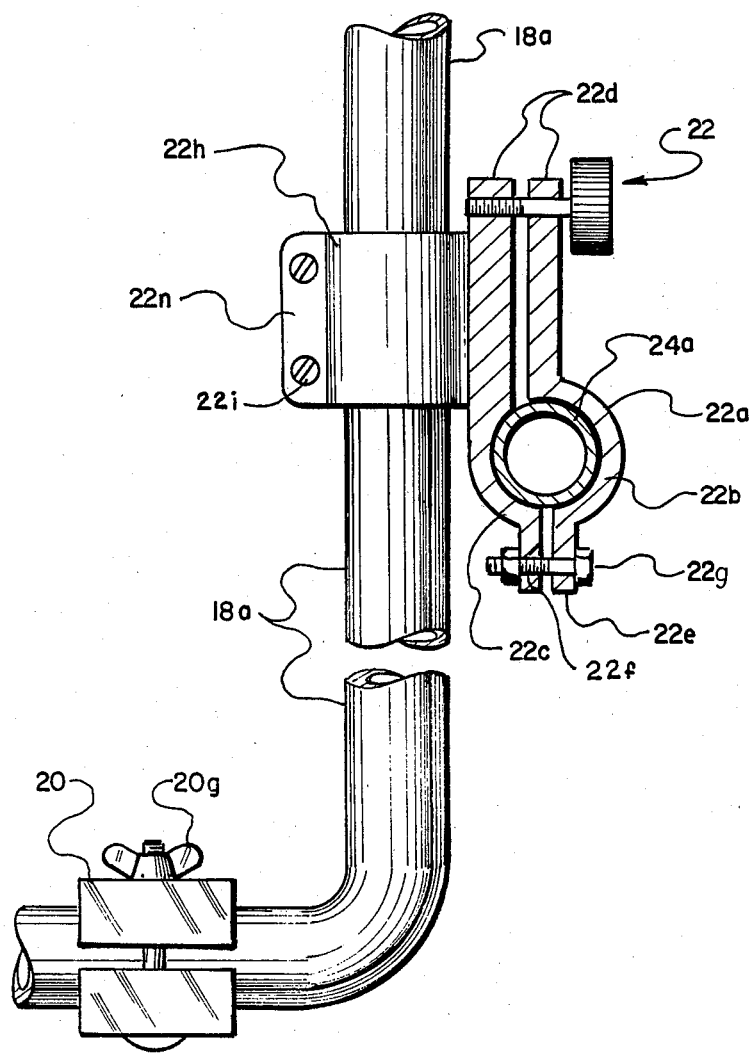
FIG. 11 is a side view of the infant seat positioning device attached to the lower handlebar section.

The infant seat positioning device 22 allows the infant seat attachment base 18 to be adjusted in height and in a forward or backward lateral direction. As shown in FIG. 11, the device 22 is comprised of a horizontally oriented sleeve 22a consisting of an outer sleeve section 22b and an inner sleeve section 22c. The sleeve diameter is sized to fit over the side tubular structure 18a of the infant seat attachment base 18. Each of the two sleeve sections have an upper flange 22d and a lower flange 22e with each flange pair having a threaded bore 22f into which is inserted a bolt 22g for tightening the flange pair when the desired lateral position of the infant seat attachment base 18 is reached.

The outer side of the inner sleeve section 22c has a flexible vertically oriented split sleeve 22h having a diameter sized to fit over the lower handlebar section 24a. The sleeve is equipped with a tightening means 22i such as a pair of bolts, that are tightened when the desired height of the infant seat attachment base 18 is attained.

The final element described for the preferred embodiment is the handlebar steering assembly 24. This assembly, as best shown in FIG. 7, is basically comprised of a tubular lower handlebar section 24a, a handlebar adjustment sleeve 24h, and an upper tubular telescoping handlebar section 24j. The bottom end of the lower handlebar section has conventionally attached a two section flanged T-sleeve 24b as best shown in FIG. 8. The sleeve 24b is sized to fit over the back end section 12i of the carriage base assembly 12 as best shown in FIG. 9. The handlebar adjustment sleeve 24h is conventionally attached to the top end of the lower handlebar section 24a. This sleeve as best shown in FIG. 10, has a flanged area incorporating a tightening means 24i such as a bolt and nut combination.

The upper telescoping handlebar section 24j has a diameter sized to fit into the tubular opening of the lower handlebar section 24a. The height of the telescoping handlebar section 24i is adjusted by loosening the adjustment sleeve 24h, raising or lowering the section 24j and then tightening the adjustment sleeve. The top end of the upper telescoping sections are equipped with a handlebar grip 24k to facilitate pushing and pulling the invention when it is in the baby stroller configuration.

The second embodiment of the invention 10 is comprised of four major elements: an infant seat 30, a pair of handlebar steering rods 32, a pair of retractable wheel housing assemblies 38, and four wheel assemblies 39.

The infant seat 30, as shown in FIG. 12, is molded in one piece and has a pair of vertically oriented handlebar sleeves 30a at each back corner, a pair of lifting slots 30b, a threaded insert located normal to the outside wall on each of the handlebar sleeves 30a and a pair of seat wheel-axle bores 30d horizontally oriented on each lower side wall. The seat 30 may be molded by a conventional process employing a high-impact thermoplastic.

Inserted into each of the handlebar sleeves 30a are the handlebar steering rods 32. The rods 32 are adjusted in height by moving them to the desired height and then tightening a handlebar steering rod adjustment knob 34 which is threaded into the threaded insert 30c.

The assembly that allows the infant seat 30 to be used as both an automobile seat and a baby stroller seat is the retractable wheel housing assembly 38 that is attached to each side of the seat 30 by conventional means such as an adhesive or a nut and bolt combination. The assembly 38 is comprised of two major subassemblies, an upper wheel housing 38a and a lower wheel housing 38f.

The upper wheel housing 38a, as best shown in FIGS. 13 and 14, has an opening on its lower side and a pair of upper housing wheel axle bores 38b extending through the inner side wall such that when the upper housing is attached to the infant seat 30, the upper housing wheel axle bores 30b are in alignment with the respective seat wheel axle bores 30d.

On the upper inside wall is located a downward bias leaf spring 38c that is held against the upper wall by a spring retaining means such as by bolting the spring to the upper wall. Attached also to the upper wheel housing 38a near its lower edge, as best shown in FIG. 13, is a spring-loaded locking bar 38d. In its normal loaded position the locking bar is biased horizontally toward the infant seat. The use of the locking bar is explained infra.

The lower wheel housing 38f, as also best shown in FIGS. 13 and 14, is sized to slideably traverse inside the opening of the upper housing 38a. The housing 38f is designed with a set of wheel wells 38g and a set of vertically oriented wheel axle slots 38h that are in edge alignment with their respective seat wheel axle bores 30d and the upper housing wheel axle bores 38b. The lower wheel housing 38f also has on its outside wall an extended lock slot 38i and a retracted lock slot 38h aligned vertically below the extended lock slot. Both the slots are also in alignment with the spring loaded locking bar 38d. When the lower housing is in the extended position, as shown in FIG. 14, the invention 10 is configured for use as an automobile infant seat. In this position, the locking bar 38d is inserted into the extended lock slot 38i. To release the lower housing from the extended position the spring loaded locking bar 38d is pressed and the lower housing is manually pressed upwardly. The housing is pressed upwardly as best shown in FIG. 13, until the locking bar 38d is allowed to fit into the retracted lock slot 38k. In the retracted position, the invention is configured for use as a baby stroller as shown in FIG. 13. To further stabilize the retracting and extending tracking action of the retractable wheel housing assembly 38, the upper wheel housing 38a may be designed, as shown in FIG. 16 with a vertically oriented guide channel 38m. The lower wheel housing 38f is designed with a respective guide rail 38n that is sized to traverse inside the guide channel 38m.

The wheel assembly 39 used with the second embodiment is comprised of a wheel axle 39a, a wheel 39b and a wheel retaining means as described in the first embodiment. The wheel assembly is inserted consecutively into the wheel axle slot 38, the upper housing wheel axle bore 38b, and the seat wheel axle bore 30d. The wheel axle 39a is captively held to the infant seat 30 by conventional means.

An accessory that may be used with the second embodiment is a spring-loaded lock-rod device 60 that allows the seating angle (recline) of the infant seat to be adjusted. When this device is used, the retractable wheel housing assembly 38 is pivotally held in place by means of a pivotal wheel axle 39a (not shown), and the lock-rod that is inserted into one of a plurality of seat adjustment bores 30e located on the arm side-panel of the infant seat as shown in FIG. 15.

The third embodiment of the invention 10 is comprised of six major elements: an infant seat 40, a pair of handlebar steering rods 32, a pair of wheel housings 42, a pair of wheel retracting/extending assemblies 44, four wheel/axle assemblies 46, and a pair of wheel retracting/extending mechanisms 48.

The infant seat 40, as shown in FIG. 17, is also molded in one piece and has a pair of vertically oriented handlebar sleeves 40a at each back corner, a pair of lifting slots 40b and a threaded insert 40c located normal to the outside wall on each of the handlebar sleeves 40a. The seat 40 may be molded of a high-impact plastic by a conventional process.

Inserted into each of the handlebar sleeves 40a are the handlebar steering rods 32. The rods may be adjusted in length, to suite the height of the user, by moving then to the desired length and then tightening, as shown in FIG. 20, a handlebar steering rod adjustment knob 34 which is threaded into the threaded insert 40c.

The assembly that allows the infant seat 40 to be used as both an infant automobile seat and a baby stroller seat is the wheel housing 42 that incorporates the wheel retracting/extending assembly 44. The upper portion (approximately two-thirds) of the inner side wall 42b of each housing 42, as best shown in FIG. 19, is attached to the outside wall of each seat 40 by conventional means such as an adhesive or a nut and bolt combination.

The housing 42 is a one piece element that is also made of a high-impact plastic. Within each of the housings 42 is located a set of wheel wells 42a on the lower section, and attached to each end of the inside wall nearer the seat is the wheel retracting/extending assembly 44. The assembly 44, as shown in FIG. 19, is comprised of a slot assembly 44a incorporating a vertical T-slot 44b. Within the vertical T-slot is a captively held spring-loaded axle-arm 44c that is designed to traverse within the T-slot 44b. *The spring 44d* is located on top of the axle arm and applies a downward pressure to the top of the axle arm. At the lower end of the vertical T-slot is also located a wheel axle bore 44e into which is inserted a wheel axle assembly 46.

The wheel axle assembly 46 is comprised of an axle having a flanged inner section 46a that is captively held, by a holding means, within the wheel axle bore 44e located on each of the wheel retracting/extending assemblies 44. The axle also has a threaded outer section 46.

On to each of the wheel axles is rotatably attached a wheel 46c between the flanged inner section 46a and a wheel washer 46d. The wheel is held in place by a wheel retaining nut 46e threaded into the threaded section. The nut in turn, is captively held by a cotter key. Other wheel retaining devices such as a snap-on axle cap may also be used.

The means for retracting and extending the wheels within the vertical T-slot 44b is accomplished by a conventional pivot linkage mechanism means 48. One such linkage that may be employed is a Watts straight line linkage that is connected between the two wheel axles as shown in FIG. 18. The linkage is operated by a mechanism handle 48a protruding outside the wheel housing 42.

All the embodiments described herein and in particular the first embodiment, may be designed with a 360-degree front wheel swiveling assembly 70. Since there are numerous wheel swiveling designs known in the art, no particular design is described, however, a typical design that may be used is shown in FIG. 21. The use of swiveling wheels will allow the invention to turn easier, thus producing easier steering and maneuvering when the invention is used as a baby stroller. In the first embodiment, the wheel swiveling assembly 70 would be attached to the front U-shaped member 12a of the carriage base assembly 12.

Additionally, the second and third embodiments may also be designed to allow automobile seats from different manufacturers to be used in lieu of the single molded seat 30, 40. In this design, as typically shown in FIG. 22, a double wheel housing 80 is designed to function as the upper wheel housing 38a or the wheel housing 42 of the second and third embodiment respectively. Attached, to the inside channel 80a, by a conventional attaching means, is an infant seat attachment base 18. To the base 18 is then attached a set of adjustable infant seat adapters 20, that allow various designs of infant seats to be attached. The adapters are best shown in FIGS. 6 and 7 and are described in the preferred embodiment.

Although the invention has been described in complete detail and pictorally shown in the accompanying drawings, it is not to be limited to such details since many changes and modifications may be made to the invention without departing from the spirit and scope thereof. Hence, the invention is described to cover any and all modifications and forms which may come within the language and scope of the claims.

We claim:

1. A combination automobile infant seat and baby stroller assembly comprising:

(a) a carriage base assembly configured in the shape of a rectangle,
    (b) a set of retractable wheel and fender assemblies where an assembly is attached to each side of said carriage base assembly and where each of said retractable wheel and fender assemblies have a means to be maintained in an extended wheels down position and in a retracted wheels up position,
    (c) means for retracting and extending the wheels on said retractable wheel and fender assembly,
    (d) a handlebar steering assembly attached to said carriage base assembly comprised of a tubular section where the bottom end of the tubular section is rigidly attached to the back section of said carriage base assembly,
    (e) an infant seat attachment base attached to said handebar steering assembly, comprised of a tubular structure having means to be adjustably attached to said handlebar steering assembly, the means to adjust said infant seat attachment base comprises a set of infant seat positioning devices comprised of an adjustable horizontally oriented sleeve and a vertically oriented sleeve where the horizontal sleeve is attached to the tubular structure of said infant seat attachment base and where the vertical sleeve is attached to the bottom tubular section of said handlebar steering assembly,
    (f) a plurality of adjustable infant seat adapters attached to the tubular structure of said infant seat attachment base where said adapters allow usage of various configurations of infant seats,
    (g) an infant seat attached to said infant seat adapters, and
    (h) said infant seat adapters attached to said infant seat attachment base.

2. The combination automobile seat and baby stroller assembly as specified in claim 1 wherein said carriage base assembly is further comprised of a front U-shaped member and back U-shaped member such that when the two members abut a tubular rectangular structure is formed.

3. The combination automobile infant seat and baby stroller assembly as specified in claim 1 wherein said retractable wheel and fender assemblies further comprise a horizontal support sleeve that allows attachment to said carriage base assembly and a set of vertical members, including a center vertical member that is attached over a wheel and fender locking pin bore located on said carriage base assembly and where the means to retract and extend said wheel and fender assemblies is accomplished by a wheel locking mechanism incorporated into the center vertical member.

4. The retractable wheel and fender assembly as specified in claim 3 wherein the wheel locking mechanism further comprises:

(a) a locking pin piston having a diameter that allows the piston to partially traverse the inside diameter of the center vertical member which is centrally attached to said carriage base assembly,
    (b) a locking pin rigidly attached to the bottom of the locking pin piston that is inserted into the wheel and fender locking pin bore located on said carriage base assembly, and
    (c) means to release the locking pin from the locking pin bore when said wheel and fender assembly is to be placed in the retracted position.

5. The combination automobile infant seat and baby stroller assembly as specified in claim 1 wherein the handlebar steering assembly is further comprised of a lower tubular handlebar section that is rigidly attached to the back section of said carriage base assembly and an upper telescoping handlebar section having a diameter that allows the upper section to traverse within the tubular section of the lower tubular section and to be adjusted and held in length by means of a handlebar adjustment sleeve.

6. A combination automobile infant seat and baby stroller assembly comprising:
   (a) a carraige base assembly configured in the shape of a rectangle comprising:
      (1) a front U-shaped member having a front end section and two contiguous parallel front side sections each extending beyond the side midpoint of the rectangle, with the front end section having on its inside surface a plurality of front strut rod bores and where near the front of each front side section is located a front wheel and fender assembly alignment pin extending upwardly and with each front side section having a set of first wheels and a fender locking pin bore extending through the upper surface of each front side section and located at a point corresponding to the midpoint of the rectangle side,
      (2) a back U-shaped member having a back end section and two contiguous parallel back side sections having their ends abutting with the ends of their respective front side sections with the back end section also having its inside surface a plurality of back strut rod bores corresponding in quantity and aligned with their respective front strut rod bores and where near the back of each back side section is located a back wheel and fender assembly alignment pin extending upwardly,
      (3) a plurality of horizontal support struts where each strut end is inserted, at the time of assembly, into its respective front strut rod bore and back strut rod bore,
   (b) a set of retractable wheel and fender assemblies where each assembly comprises:
      (1) a horizontal support sleeve comprising:
         (A) a sleeve having an inside diameter that allows the front side sections of the front U-shaped member to slip into the respective front sleeve openings and the back side sections of the back U-shaped member to slip into the respective back sleeve openings,
         (B) a 90-degree alignment slot located at each upper end of the sleeve and having a slot opening that allows the respective front wheel and fender alignment pin and back wheel and fender alignment pin on said carriage base assembly to fit upwardly into the respective alignment slot to allow the horizontal support sleeve to traverse through a 90-degree arc,
         (C) a second wheel and fender locking pin bore extending through the upper surface of each horizontal support sleeve, where each bore is in alignment with the first wheel and fender locking pin bore on the front U-shaped member of said carriage base assembly,
         (D) a wheel axle extending outwardly from the side of the sleeve with said axle having an inward wheel flange and an outward threaded section, and
         (E) an upper horizontal member having attached one vertical member located in the front and another located in the back and in the center a center vertical member where each of the vertical members are contiguous to the upper horizontal members and curve downwardly at a 90-degree angle and where each member is attached to the upper surface of the horizontal support sleeve with the center vertical member having an inside diameter incorporating a spring retaining ledge and having located near its outward end a pin release handle slot extending parallel through both side walls of the member and further having located within its inside diameter a wheel locking mechanism comprising:
            (1) a locking pin piston having a diameter that allows the piston to traverse the inside diameter of the center vertical member,
            (2) a locking pin rigidly attached to the bottom of the locking pin piston and having a diameter that allows the pin to fit in turn into one of the first wheel and fender locking pin bore located on the front U-shaped member of said carriage base assembly and through the second wheel and fender locking pin bore located on the horizontal support sleeve of said retractable wheel and fender assembly,
            (3) a pin release handle inserted into the pin release handle slot located in the center vertical member of said retractable wheel and fender assembly,
            (4) a pin release cable having one end attached to the top of the locking pin piston and the other end attached to the inward side of the pin release handle,
            (5) a downward bias spring having the upper end held captively against the spring retaining ledge in the center vertical member of said retractable wheel and fender assembly and having the lower end applying a downward pressure to the top of the locking pin piston,
   (c) a set of wheels with each wheel having an axle diameter that allows each wheel to be rotatably mounted upon each of the wheel axles where each wheel is rotatably held in place by sequentially inserted into the wheel axle an outward wheel washer, a wheel axle nut and a cotter key,
   (d) an infant seat attachment base configured in the shape of a tubular rectangle frame,
   (e) a plurality of adjustable infant seat adapters where each adapter comprises:
      (1) an outer section having an upper concave area and a lower concave area and having an adjustment bolt bore located between the two concave areas and extending therethrough,
      (2) an inner section having an upper concave area and a lower concave area where both are in alignment with their respective concave areas in the outer section and also having an adjustment bolt bore located between the two concave areas and extending therethrough and in alignment with the bore in the outer section,
      (3) an adjustment bolt that is inserted through each of the adjustment bolt bores in the outer and inner section after the lower concave areas are placed over the front and back tubular sections of the infant seat attachment base and the upper concave areas are placed over the tubular member of an infant seat,
      (4) a winged nut that is placed over the end of the adjustment bolt to tighten the adjustable infant seat adapters, (f) an infant seat positioning device comprising a horizontally oriented sleeve having an outer sleeve section and an inner sleeve section where the sleeve diameter is sized to fit over the side tubular structure of the infant seat attachment base and where each of the two sleeve sections have an upper flange and lower flange with each respective flange pair having a threaded bore into which is inserted a bolt for tightening the flange pair and where the outer side of the inner sleeve section has a flexible vertically oriented split sleeve having a diameter sized to fit over the lower handlebar section of the handlebar steering assembly and where the sleeve is equipped with a tightening means, (g) a handlebar steering assembly comprising:
  (1) a lower handlebar section,
  (2) a two section flanged T-sleeve consisting of a horizontal sleeve having an upper section and a lower section where the upper section has attached a vertical sleeve having a diameter that allows the bottom end of the lower handlebar section to be inserted and conventionally attached, and with the horizontal sleeve having a diameter that fits over the back end section of the carriage base assembly,
  (3) a handlebar adjustment sleeve conventionally attached to the top end of the lower handlebar section where the sleeve has the means to allow the sleeve diameter to be adjusted,
  (4) an upper telescoping handlebar section having a diameter that allows its bottom end to be easily inserted into the lower tubular handlebar section and where the height of the telescoping handlebar section is adjusted by means of the handlebar adjustment sleeve, and
  (5) a set of handlebar grips attached to the top end of the upper telescoping handlebar section.

7. The combination automobile infant seat and baby stroller assembly as specified in claim 6 wherein the front wheel and fender alignment pins and the back wheel and fender alignment pins are spring loaded to allow the front-side section and back-side section to be easily inserted into the horizontal support sleeve of said retractable wheel and fender assemblies.

8. The combination automobile infant seat and baby stroller as specified in claim 6 further comprising a front wheel swiveling assembly attached to the front U-shaped member on said carriage base assembly.

* * * * *